United States Patent
Bumb et al.

(10) Patent No.: US 10,239,014 B2
(45) Date of Patent: Mar. 26, 2019

(54) CARBON CAPTURE SOLVENTS AND METHODS FOR USING SUCH SOLVENTS

(71) Applicants: CARBON CLEAN SOLUTIONS PVT, LTD, Bangalore (IN); Prateek Bumb, Jaipur (rajastan) (IN); Ramesh Kumar Ausula, Bangalore (IN); Aniruddha Sharma, Bhopal Madhya Pradesh (IN)

(72) Inventors: Prateek Bumb, London (GB); Ramesh Kumar Ausula, Marathahalli (IN); Aniruddha Sharma, Paris (FR)

( * ) Notice: Subject to any disclaimer, the term of this patent is extended or adjusted under 35 U.S.C. 154(b) by 176 days.

(21) Appl. No.: 14/765,935

(22) PCT Filed: Jan. 31, 2014

(86) PCT No.: PCT/IB2014/000419
§ 371 (c)(1),
(2) Date: Aug. 5, 2015

(87) PCT Pub. No.: WO2014/118633
PCT Pub. Date: Aug. 7, 2014

(65) Prior Publication Data
US 2016/0193563 A1    Jul. 7, 2016

Related U.S. Application Data

(60) Provisional application No. 61/759,191, filed on Jan. 31, 2013.

(51) Int. Cl.
*B01D 53/14* (2006.01)

(52) U.S. Cl.
CPC ..... *B01D 53/1493* (2013.01); *B01D 53/1425* (2013.01); *B01D 53/1475* (2013.01); *B01D 2251/306* (2013.01); *B01D 2251/606* (2013.01); *B01D 2252/103* (2013.01); *B01D 2252/2023* (2013.01); *B01D 2252/2026* (2013.01); *B01D 2252/2041* (2013.01); *B01D 2252/2056* (2013.01); *B01D 2252/20405* (2013.01); *B01D 2252/20426* (2013.01); *B01D 2252/20431* (2013.01); *B01D 2252/20447* (2013.01);
(Continued)

(58) Field of Classification Search
None
See application file for complete search history.

(56) References Cited

U.S. PATENT DOCUMENTS

| | | | |
|---|---|---|---|
| 6,436,174 B1 * | 8/2002 | Grossmann | B01D 53/1456 423/226 |
| 7,842,126 B1 * | 11/2010 | Dilmore | B01D 53/1475 95/195 |
| 2013/0164204 A1 * | 6/2013 | Bumb | B01D 53/1418 423/232 |

OTHER PUBLICATIONS

Written Opinion of the International Searching Authority for Pdt/1132014/000419, dated Nov. 4, 2014.
(Continued)

*Primary Examiner* — Daniel Berns
(74) *Attorney, Agent, or Firm* — Lewis Brisbois Bisgaard & Smith LLP; Nigamnarayan Acharya

(57) ABSTRACT

A solvent for recovery of carbon dioxide from gaseous mixture, having alkanolamine, reactive amines acting as promoter or activators, glycol, and a carbonate buffer. A solvent for recovery of carbon dioxide from gaseous mixture, having alkanolamine, reactive amines acting as promoter or activators, sulfolane, and a carbonate buffer. One specific solvent contains less than about 75% by weight of water and has a single liquid phase.

10 Claims, 3 Drawing Sheets

(52) U.S. Cl.
CPC .............. *B01D 2252/20478* (2013.01); *B01D 2252/20489* (2013.01); *B01D 2252/504* (2013.01); *B01D 2252/602* (2013.01); *B01D 2257/304* (2013.01); *B01D 2258/0283* (2013.01); *F23J 2215/50* (2013.01); *F23J 2219/40* (2013.01); *Y02C 10/06* (2013.01); *Y02E 20/16* (2013.01); *Y02E 20/18* (2013.01)

(56) References Cited

OTHER PUBLICATIONS

International Search Report for PCT/IB2014/000419, dated Nov. 4, 2014.

\* cited by examiner

Schematic diagram for CO₂ recovery

T = 40 C

CARBON CAPTURE SOLVENTS AND METHODS FOR USING SUCH SOLVENTS

STATEMENT OF RELATED APPLICATIONS

This patent application is a national stage application of PCT application No. PCT/IB2014/000419 having a filing date of Jan. 31, 2014 and which claims the benefit of U.S. provisional patent application No. 61/759,191 having a filing date of Jan. 31, 2013, which are incorporated herein in their entirety by reference.

BACKGROUND

This disclosure relates to a method for the preparation of solvents and methods for treatment of industrial effluent gases, and, more specifically, this disclosure relates to solvents and process for using these solvents to aid in the removal of carbon dioxide ($CO_2$) from other sources such as power plants or industrial utility.

SUMMARY

This disclosure is directed towards a solvent for recovery of carbon dioxide from gaseous mixture having an alkanolamine, reactive amines acting as promoter or activators, and a carbonate buffer. One specific solvent contains less than about 75% by weight of dissolving medium water and glycol (e.g., polyethylene glycol) and has a single liquid phase. Another specific solvent contains less than about 75% by weight of dissolving medium water and glycol (e.g., polyethylene glycol) and has a single liquid phase. Another specific solvent contains less than about 75% by weight of dissolving medium water and sulfolane and has a single liquid phase.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the accompanying figures in which.

DEFINITIONS

As used herein, the term "solvent" can refer to a single solvent or a mixture of solvents.

DETAILED DESCRIPTION

This disclosure includes several aspects and provides methods and solvents that, when used alone or in combination, may significantly reduce or eliminate carbon dioxide ($CO_2$) emissions from industrial plants that burn solid fuels, particularly coal-fired power plants. This disclosure is directed to $CO_2$ capture/sequestration from flue gases $CO_2$ emissions should also be applicable to $CO_2$ capture from gas and oil fired boilers, combined cycle power plants, coal gasification, and hydrogen plants, biogas plants.

Figure 1:
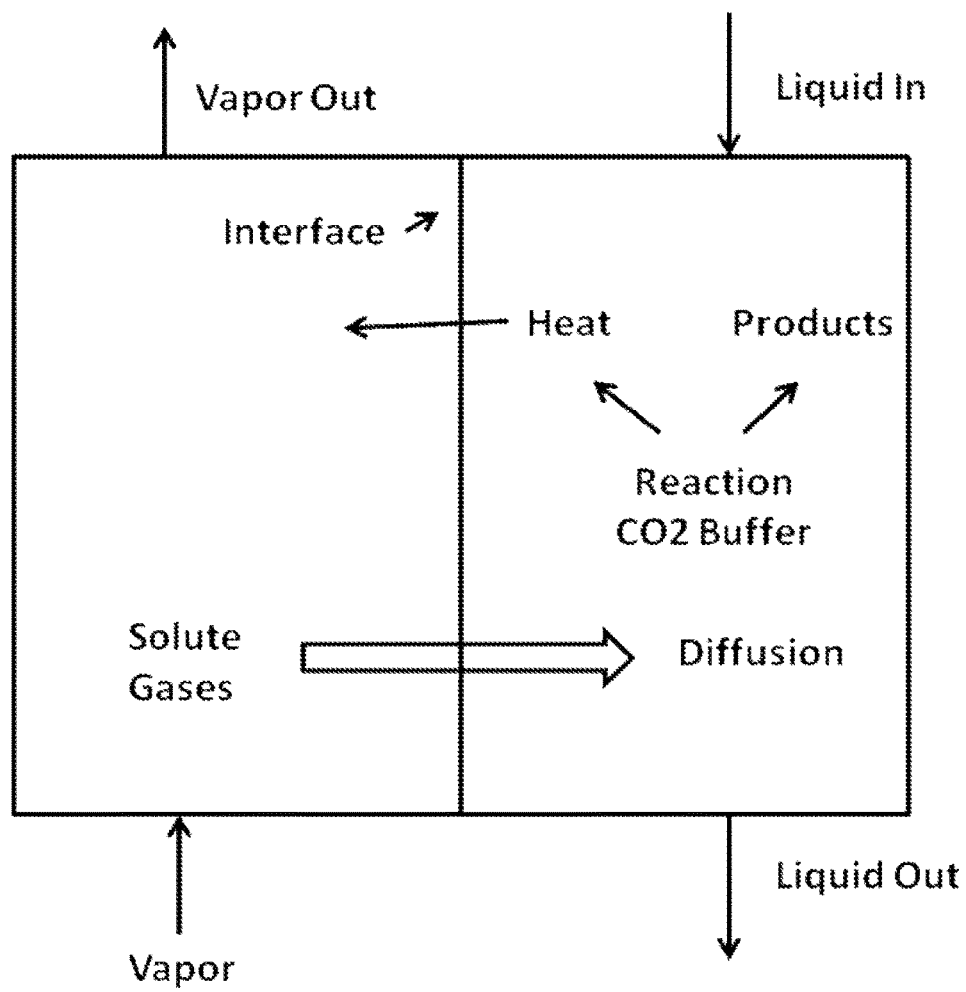
FIG. 1 is a schematic picture of the reaction.

As shown in FIG. 1, the vapor and liquid phases are contact in a small cross-section. In treating the emissions, the absorption step involves removal of acid gases and other components from the gas phase by transport into the liquid phase. The gas-liquid interface separates the phases. An absorbing gas dissolves into the liquid at the interface, then diffuses across a thin layer of liquid (termed the diffusion layer) of one specific solvent. As it diffuses, the gas meets the reactive absorbent component in one specific solvent, reacts with it, and generates heat and reaction products such as carbonate. Reaction products can diffuse into the bulk liquid while the liberated heat of reaction heats the liquid. In one example, there is a mixture of tertiary amine/hindered amine, reactive amines (e.g, a polyamine activator), carbonate buffer, a dissolving medium of water and physical polyethylene glycol as to solvent system remain as a single liquid phase in removing acidic gases from gaseous mixture.

In embodiment, one specific solvent for absorbing $CO_2$ includes alkanolamines, which can be any one of compounds represented by following formulae (I) to (III) or a mixture thereof:

Nitrogen-containing compound (I)

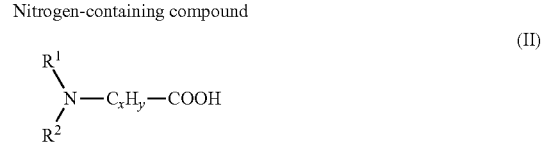

Nitrogen-containing compound (II)

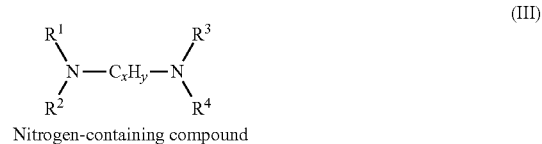

Nitrogen-containing compound (III)

in the formulae (I) to (III): x and y respectively satisfy relationship: 1 less than or equal to 5 and 2 less than or equal to 10; and $R^1$, $R^2$, $R^3$, and $R^4$ represent —$C_iH_jO_kN_l$ (where i=0 to 10, j=1 to 21, k=0 to 5, and l=0 to 5).

In one illustrative solvent, reactive amines can be any one of nitrogen containing compounds represented by following formulae (IV) to (XIII) or mixture thereof. Reactive amines may be nitrogen-containing compound having a secondary nitrogen in a ring or a nitrogen-containing compound having a tertiary nitrogen in a ring.

In another illustrative solvent, reactive amines can be a nitrogen-containing compound having secondary and tertiary nitrogen in a ring.

In another illustrative solvent, reactive amines can be a nitrogen-containing compound having a nitrogen in a substituent group branching from the ring.

In another illustrative solvent, reactive amines can be nitrogen-containing compound may be a nitrogen-containing compound having a primary nitrogen in a substituent group branching from the ring.

In another illustrative solvent, reactive amines can be a nitrogen-containing compound having three nitrogen atoms or more in a molecule thereof.

In another illustrative solvent, reactive amines can be a nitrogen-containing compound having in a molecule thereof all of primary, secondary, and tertiary nitrogens.

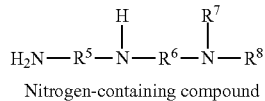

Nitrogen-containing compound (IV)

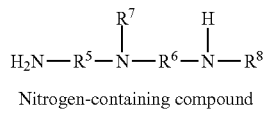

Nitrogen-containing compound (V)

in the formulae (IV) to (V): $R^5$ and $R^6$ represent $-C_iH_jO_kN_l$ (where i=0 to 10, j=0 to 26, k=0 to 5, and l=0 to 5); and $R^7$ and $R^8$ represent $-C_iH_jO_kN_l$ (where i=1 to 10, j=0 to 26, k=0 to 5, and l=0 to 5),

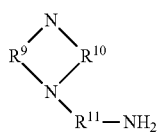

Nitrogen-containing compound (VI)

in the formula (VI): $R^9$ and $R^{11}$ represent $-C_iH_jO_kN_l$ (where i=0 to 10, j=0 to 26, k=0 to 5, and l=0 to 5); and R10 represents $-C_iH_jO_kN_l$ (where i=1 to 10, j=0 to 26, k=0 to 5, and l=0 to 5),

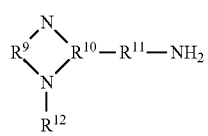

Nitrogen-containing compound (VII)

in the formula (VII): $R^9$ and $R^{11}$ represent $-C_iH_jO_kN_l$ (where i=0 to 10, j=0 to 26, k=0 to 5, and l=0 to 5); and $R^{10}$ and $R^{12}$ represent $-C_iH_jO_kN_l$ (where i=1 to 10, j=0 to 26, k=0 to 5, and l=0 to 5),

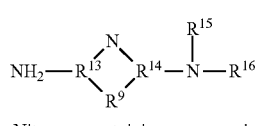

Nitrogen-containing compound (VIII)

in the formula (VIII): $R^9$ represents $-C_iH_jO_kN_l$ (where i=0 to 10, j=0 to 26, k=0 to 5, and l=0 to 5); and $R^{13}$, $R^{14}$, $R^{15}$ and $R^{16}$ represent $-C_iH_jO_kN_l$ (where i=1 to 10, j=0 to 26, k=0 to 5, and l=0 to 5),

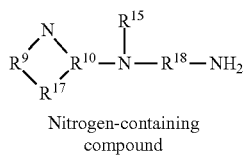

Nitrogen-containing compound (IX)

in the formula (IX): R9 and R18 represent $-C_iH_jO_kN_l$ (where i=0 to 10, j=0 to 26, k=0 to 5, and l=0 to 5); and R10, R15 and R17 represent $-C_iH_jO_kN_l$ (where i=1 to 10, j=0 to 26, k=0 to 5, and l=0 to 5),

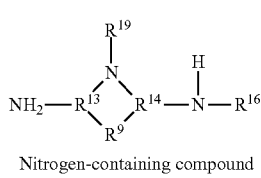

Nitrogen-containing compound (X)

in the formula (X): $R^9$ represents $-C_iH_jO_kN_l$ (where i=0 to 10, j=0 to 26, k=0 to 5, and l=0 to 5); and $R^{13}$, $R^{14}$, $R^{16}$ and $R^{19}$ represent $-C_iH_jO_kN_l$ (where i=1 to 10, j=0 to 26, k=0 to 5, and l=0 to 5),

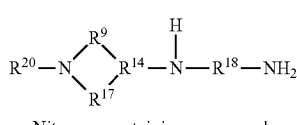

Nitrogen-containing compound (XI)

in the formula (XI): $R^9$ and $R^{18}$ represent $-C_iH_jO_kN_l$ (where i=0 to 10, j=0 to 26, k=0 to 5, and l=0 to 5); and $R^{14}$, $R^{17}$ and $R^{20}$ represent $-C_iH_jO_kN_l$ (where i=1 to 10, j=0 to 26, k=0 to 5, and l=0 to 5),

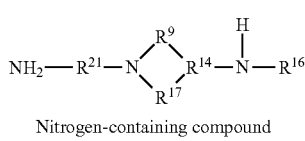

Nitrogen-containing compound (XII)

in the formula (XII): $R^9$ and $R^{21}$ represent $-C_iH_jO_kN_l$ (where i=0 to 10, j=0 to 26, k=0 to 5, and l=0 to 5); and $R^{14}$, $R^{16}$ and $R^{17}$ represent $-C_iH_jO_kN_l$ (where i=1 to 10, j=0 to 26, k=0 to 5, and l=0 to 5),

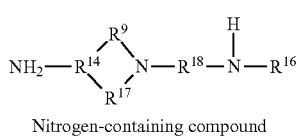

Nitrogen-containing compound (XIII)

in the formula (XIII): $R^9$ and $R^{18}$ represent $-C_iH_jO_kN_l$ (where i=0 to 10, j=0 to 26, k=0 to 5, and l=0 to 5); and $R^{14}$, $R^{16}$ and $R^{17}$ represent $-C_iH_jO_kN_l$ (where i=1 to 10, j=0 to 26, k=0 to 5, and l=0 to 5).

In one specific solvent, the second compound component may be any one of nitrogen-containing compounds represented by following formulae (XIV) to (XIX) or a mixture thereof:

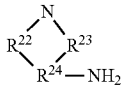
(XIV)
Nitrogen-containing compound in the formula (XIV): $R^{22}$ represents —$C_iH_jO_kN_l$ (where i=0 to 10, j=0 to 26, k=0 to 5, and l=0 to 5); and $R^{23}$ and $R^{24}$ represent —$C_iH_jO_kN_l$ (where i=1 to 10, j=0 to 26, k=0 to 5, and l=0 to 5),

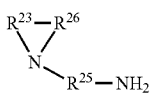
(XV)
Nitrogen-containing compound in the formula (XV): $R^{25}$ represents —$C_iH_jO_kN_l$ (where i=0 to 10, j=0 to 26, k=0 to 5, and l=0 to 5); and R23 and $R^{26}$ represent —$C_iH_jO_kN_l$ (where i=1 to 10, j=0 to 26, k=0 to 5, and l=0 to 5),

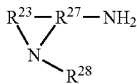
(XVI)
Nitrogen-containing compound in the formula (XVI): $R^{23}$, $R^{27}$ and $R^{28}$ represent —$C_iH_jO_kN_l$ (where i=1 to 10, j=0 to 26, k=0 to 5, and l=0 to 5),

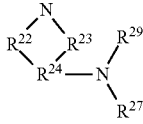
(XVII)
Nitrogen-containing compound in the formula (XVII): $R^{22}$ represents —$C^iH^jO^kN^l$ (where i=0 to 10, j=0 to 26, k=0 to 5, and l=0 to 5); and $R^{23}$, $R^{24}$, $R^{27}$ and $R^{29}$ represent —$C_iH_jO_kN_l$ (where i=1 to 10, j=0 to 26, k=0 to 5, and l=0 to 5),

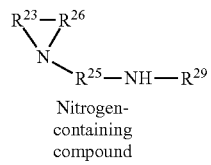
(XVIII)
Nitrogen-containing compound in the formula (XVIII): $R^{25}$ represents —$C_iH_jO_kN_l$ (where i=0 to 10, j=0 to 26, k=0 to 5, and l=0 to 5); and $R^{23}$, $R^{26}$ and $R^{29}$ represent —$C_iH_jO_kN_l$ (where i=1 to 10, j=0 to 26, k=0 to 5, and l=0 to 5),

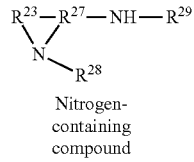
(XIX)
Nitrogen-containing compound in the formula (XIX): $R^{23}$, $R^{27}$, $R^{28}$ and $R^{29}$ represent —$C_iH_jO_kN_l$ (where i=1 to 10, j=0 to 26, k=0 to 5, and l=0 to 5)

In one specific solvent, the reactive amine may be a nitrogen-containing compound represented by following formula (XX):

(XX)
Nitrogen-containing compound in the formula (XX): $R^{30}$, $R^{32}$, $R^{33}$ and $R^{34}$ represent —$C_iH_jO_kN_l$ (where i=1 to 10, j=0 to 26, k=0 to 5, and l=0 to 5), and $R^{31}$ represents —$C_iH_jO_kN_l$ (where i=0 to 10, j=0 to 26, k=0 to 5, and l=0 to 5).

In one specific solvent, the reactive amine may be piperazine, N-2-Hydroethyl Piperazine, 2-aminomethyl piperazine or mixture thereof.

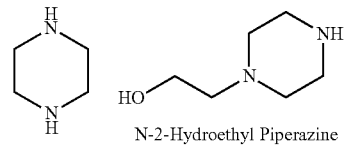

Piperazine    N-2-Hydroethyl Piperazine

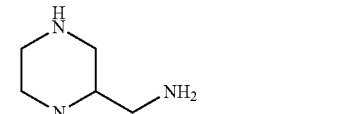

2-aminomethyl piperazine

In one illustrative solvent, one of one specific solvent components can be represented by polyethylene glycol (PEG) represented by the following formulae (XXI) and/or physical pressure driven solvent or mixture thereof:

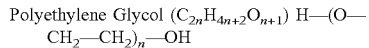

where, n=integer

Glycols suitable with specific embodiments include monoethylene glycol (EG), Diethylene Glycol (DEG), Triethylene Glycol, Tetraethylene Glycol, Methoxytriglycol (MTG). Other physical solvent used as a solvent component are Sulfolane, N-Methyl-2-Pyrrolidone (NMP).

In one specific solvent, alkanolamines may be contained in an amount in a range from equal to or larger than 10 wt % to equal to or less than 40 wt %, reactive amines may in an amount in a range from equal to or larger than 6 wt % to equal to or less than 40 wt %, and a total amount of the alkanolamine and reactive amines may be more than 20 wt % to equal to or less than 80 wt %.

In one specific solvent, the alkanolamine may be represented by the formula (I), where each of $R^1$ and $R^2$ is H.

In one specific solvent, the alkanolamine may be represented by the formula (I), where x is 2 to 4 and y is 4 to 8.

In one specific solvent, alkanolamines may be represented by the formula (I), where $R^1$ is H and $R^2$ is —CmHnOoNp (where m=1 to 5, n=1 to 11, o=0 to 5, and p=0 to 5).

In one specific solvent, the alkanolamine may be represented by the formula (I), where x is 2 to 4, y is 4 to 8, and $R^2$ is $CH_3$, $C_2H_5$, $C_3H_7$, or $C_4H_9$.

In one specific solvent, the alkanolamine may be represented by the formula (I), where R1 and $R^2$ represent —CmHnOoNp (where m=1 to 5, n=1 to 11, o=0 to 5, and p=0 to 5).

In one specific solvent, the alkanoamine may be represented by the formula (I), where x is 2, y is 4, $R^1$ is $CH_3$, and $R^2$ is $C_2H_4OH$.

An absorbent liquid for absorbing $CO_2$ or $H_2S$ or both from gas according to certain embodiments includes a cyclic amine compound having one nitrogen in a ring. In one specific solvent, the cyclic amine having one nitrogen in a ring may be a cyclic amine having one nitrogen in a 5-membered ring, 6-membered ring, or 7-membered ring.

In one specific solvent, the cyclic amine having one nitrogen in a 5-membered ring, 6-membered ring, or 7-membered ring may be pyrrolidine (PR), piperidine (PZ), or hexamethyleneimine (HMI).

In one specific solvent, the cyclic amine compound having one nitrogen in a ring may be a nitrogen containing compound having a primary nitrogen in a substituent group branching from the ring.

In one specific solvent, the nitrogen-containing compound having a primary nitrogen in a substituent group branching from the ring may be aminomethylpiperidine or aminoethylpiperidine.

In one specific solvent, the cyclic amine compound having one nitrogen in a ring may be a nitrogen-containing compound having a hydroxyl group in a 5-membered ring, 6-membered ring, or 7-membered ring.

In one specific solvent, the nitrogen-containing compound having a hydroxyl group in a 5-membered ring, 6-membered ring, or 7-membered ring may be piperidinol (PDN).

An absorbent liquid includes a mixture of one specific solvent, and an alkanolamine. In one specific solvent, the alkanolamine may be monoethanolamine (MEA), ethylaminoethanol (EAE), triethanolamine, N-methyldiethanolamine (MDEA), diisopropanolamine, diglycolamine, or a mixture thereof.

An process for removing $CO_2$ or $H_2S$ or both a includes an absorption tower that allows gas containing $CO_2$ or $H_2S$ or both and an absorbent liquid to be in contact with each other to remove $CO_2$ or $H_2S$ or both from the gas; and a regeneration tower that regenerates a solution which has absorbed the $CO_2$ or $H_2S$ or both, the absorption tower reusing the solution regenerated at the regeneration tower by removing the $CO_2$ or $H_2S$ or both from the solution.

In one embodiment, one specific solvent for recovery of carbon dioxide from gaseous mixture includes hindered amine, reactive amine, Polyethylene glycol, and a alkali carbonate buffer. The remaining solvent may be water.

Reactive amines may be a piperazine and its derivative such as piperazine, 2-aminomethyl piperazine, aminoethylpiperazine, hydroxyethylpiperazine, 3-(3-pyrrolidyl)piperidine, 2-(3-pyrrolidyl)piperazine, 3-(3-piperidyl)-piperidine, 3-(2-piperazinyl)piperidine, or 2-(2-piperazinyl)piperazine, 2-aminomethyl piperazine. The reactive amine may be ethylenediamine, dimethyl ethylenediamine, pyrazolidine, imidazolidine, 2-(2-pyrrolidyl)-pyrrolidine, 2-(2-imidazolidyl) imidazolidine or mixture thereof. One example includes a solvent having hindered amine, mixture of active amine piperazine and N-2 Hydroethyl Piperazine, a carbonate buffer, polyethylene glycol, and water.

One embodiment may include a solvent with poly ethylene glycol, any of a class of organic compounds belonging to the alcohol family; in the molecule of a glycol, two hydroxyl (OH) groups are attached to different carbon atoms. The term is often applied to the simplest member of the class, ethylene glycol. Ethylene glycol, also called 1,2-ethanediol, molecular formula $HOCH_2CH_2OH$, is a colourless, oily liquid possessing a sweet taste and mild odor. It can be produced commercially from ethylene oxide, which is obtained from ethylene. Further, propylene glycol, also called 1,2-propanediol, resembles ethylene glycol in its physical properties. Other glycols include 1,3-butanediol, 1,4-butanediol, 2-ethyl-1,3-hexanediol, and 2-methyl-2-propyl-1,3-propanediol, methoxytriglycol and others and are suitable herewith.

One specific solvent may contain hindered or tertiary amines that act as high $CO_2$ loading carrier as the base solvent to increase the capacity of the $CO_2$ capture solvent. Hindered amine/tertiary amine may be N-methyldiethanolamine (MDEA), 2-(2-aminoethoxy)ethanol, Aminoethylethanolamine (AEEA), 2-amino-2methyl-1-proponal (AMP), 2-(ethyamino)-ethanol (EAE), 2-(methylamino)-ethanol (MAE), 2-(diethylamino)-ethanol (DEAE), diisopropanolamine (DIPA), methylaminopropylamine (MAPA), 3-aminopropanol (AP), 2,2-dimethyl-1,3-propanediamine (DMPDA), 3-amino-1-cyclohexylaminopropane (ACHP), diglycolamine (DGA), 1-amino-2-propanol (MIPA), 2-methyl-methanolamine (MMEA); Di ethyl ethanol amine (DEEA)

One specific solvent may contain a carbonate buffer. The pH may range for a carbonate buffer may be between 8.0 and 9.0. Carbonate in one specific solvent increases the pH of one specific solvent. This high pH allows for increased carbon dioxide capture in the form of bicarbonate salts. The carbonate can be regenerated when one specific solvent is heated. In some instances percarbonate may contribute to the buffer system.

Suitable carbonate buffer salts are described herein. The amount of carbonate buffer salt used in the buffer system is an amount that is sufficient, when used with the remaining components, to raise salivary pH to a pH of about 7.8 or more, about 8.5 or more, and about 9 or more (e.g., about 9-11), irrespective of the starting pH.

In another embodiment, the carbonate salt is selected from the group consisting of sodium carbonate, potassium carbonate, calcium carbonate, ammonium carbonate, and magnesium carbonate. In yet another embodiment, the bicarbonate salt is selected from the group consisting of sodium bicarbonate, potassium bicarbonate, calcium bicarbonate, ammonium bicarbonate, and magnesium bicarbonate. In one embodiment, the binary buffer system comprises sodium carbonate and sodium bicarbonate. In another embodiment, the sodium bicarbonate is dessicant-coated sodium bicarbonate.

The amount of carbonate buffer and reactive amine piperazine in the solution is limited by the solubility of both components in water, thus resulting in solid solubility limit for aqueous solutions. At 25 C, the solubility of potassium carbonate buffer in a $CO_2$ rich solution is 3.6 m and the solubility of piperazine in water is approximately 2 m. With the solid solubility limitation, the resulting lower concentration can result in slow reaction rate and low solution capacity. By combining piperazine and carbonate buffer solubility in polyethylene glycol and aqueous solutions, the resultant solubility increases.

Reactive amines such as piperazine and $CO_2$ react, it undergoes equilibrium reaction to form piperazine carbamate and piperazine dicarbamate and some free and bound piperazine. Because of the addition of carbonate buffer salt; which react with free and bound piperazine in reacting more $CO_2$ to form piperazine carbamate and piperazine dicarbamate.

The ratio of equivalents of carbonate salt to equivalents of reactive amine can be between 0.3-3.0. The concentrations of the reactive amine and carbonate salt can be between 3.0-8.0 equivalents/Kg $H_2O$ or 4.0 and 6.0 equivalents/Kg $H_2O$. The amount of piperazine and carbonate buffer salt can be adjusted based on the solubility in water and polyethylene glycol.

In one example, one specific solvent and method of use for the removal of $CO_2$ from flue gas, natural gas, hydrogen gas, synthesis gas, and other process and waste gas streams. One specific solvent may contain a carbonate buffer, a reactive amine, a hindered amine, and a polyethylene glycol, resulting in the solution pH between (10-13.5) in absence of $CO_2$. The reactive amine 6 wt % to 40 wt % with the total concentration limited by the solid solubility of the reactive amine in aqueous and polyethylene glycol solution or of the carbonate buffer salt from 0.15 wt %-10 wt % with total concentration limited by the solid solubility in aqueous solution. This chemical solvent is designed to increase the rate of $CO_2$ removal to improve the efficiency of a removal process.

Piperazine is freely soluble in water and solubility in ethylene glycol up to a about 20 wt %. Carbonate buffer salt solubility in water is 112 g/100 mL at 20° C., The temperature of the solution when contacting with the gaseous stream may be between approximately 30 C-125 C. The rate constant for the reaction of $CO_2$ with the piperazine derivative ($K_{PZ}$) may be at least 25 m$^3$/mol-s at 25 C, or at least 50 m$^3$/mol-s at 25 C.

In one embodiment, one specific solvent has a reactive amine in concentration between about 6 wt % and 40 wt %.

In yet another embodiment, one specific solvent has a alkanolamine in a concentration between about 10 wt % and 40 wt %.

In yet another embodiment, one specific solvent has a carbonate buffer has concentration between about 0.15 wt %-10 wt %.

In yet another embodiment, one specific solvent has a solute concentration between about 2 wt %-40 wt %.

In yet another embodiment, one specific solvent has a tertiary balance to keep one specific solvent or solvent system as a single liquid phase.

In yet another embodiment, the solvent the alkanolamine has a weight percentage between 25 wt % and 40 wt % and is selected from group comprising N-methyldiethanolamine (MDEA), 2-amino-2methyl-1-proponal (AMP); the reactive amines have a weight percentage between 10 wt % and 25 wt % and is selected from group comprising piperazine, N aminoethylpiperazine (AEP); and the glycol has a weight percentage between 10 wt % and 25 wt %.

In yet another embodiment, the solvent the alkanolamine has a weight percentage between 30 wt % and 40 wt % and is selected from group comprising N-methyldiethanolamine (MDEA), 2-amino-2methyl-1-proponal (AMP); the reactive amines have a weight percentage between 10 wt % and 18 wt % and is selected from group comprising piperazine, N aminoethylpiperazine (AEP); and the glycol has a weight percentage between 15 wt % and 20 wt %.

In yet another embodiment, the solvent the alkanolamine has a weight percentage between 32 wt % and 35 wt % and is selected from group comprising N-methyldiethanolamine (MDEA), 2-amino-2methyl-1-proponal (AMP); the reactive amines have a weight percentage between 11 wt % and 15 wt % and is selected from group comprising piperazine, N aminoethylpiperazine (AEP); and the glycol has a weight percentage between 18 wt % and 20 wt %.

In yet another embodiment, the solvent the alkanolamine has a weight percentage between 25 wt % and 40 wt %; the reactive amines have a weight percentage between 10 wt % and 25 wt %; and the glycol has a weight percentage between 10 wt % and 25 wt %.

In yet another embodiment, the solvent the alkanolamine has a weight percentage between 30 wt % and 40 wt %; the reactive amines have a weight percentage between 10 wt % and 18 wt %; and the glycol has a weight percentage between 15 wt % and 20 wt %.

In yet another embodiment, the solvent the alkanolamine has a weight percentage between 32 wt % and 35 wt %; the reactive amines have a weight percentage between 11 wt % and 15 wt %; and the glycol has a weight percentage between 18 wt % and 20 wt %.

In yet another embodiment, the solvent the alkanolamine has a weight percentage between 25 wt % and 40 wt %; the reactive amines have a weight percentage between 10 wt % and 25 wt %; and the sulfolane has a weight percentage between 10 wt % and 25 wt %.

In yet another embodiment, the solvent the alkanolamine has a weight percentage between 30 wt % and 40 wt %; the reactive amines have a weight percentage between 10 wt % and 18 wt %; and the sulfolane has a weight percentage between 15 wt % and 20 wt %.

In yet another embodiment, the solvent the alkanolamine has a weight percentage between 32 wt % and 35 wt %; the reactive amines have a weight percentage between 11 wt % and 15 wt %; and the sulfolane has a weight percentage between 18 wt % and 20 wt %.

In another embodiment, a method of removing $CO_2$ from a gaseous stream including: contacting a gaseous stream with a solution wherein the solution is formed by combining: alkanolamines, a reactive amine, an carbonate salt, poly ethylene glycol and water; whereby the contact removes CO$_2$ from the gaseous stream; and regenerating the solution. The concentrations may be limited by the solubility of the components at a temperature and contact of the exhaust gaseous stream with one specific solvent removes CO$_2$ from the gaseous stream; and regenerating the solution.

The regenerating may include heating CO$_2$-rich solution, which may occur at a temperature of approximately 90 C-130 C, approximately 110 C. An additive such as an antifoaming agent, an antioxidant, a corrosion inhibitor (e.g. vanadium oxide or a chromate), a flocculation aid, or a mixture of two or more additives may be included as part of the solution.

In another embodiment, the method of removing CO$_2$ from a gaseous stream may further include applying a water wash system, wherein the water wash system collects the volatile alkanolamine and reactive amine from treated gaseous stream. The regeneration of the solution may occur in a vacuum stripper column, and the solution may be returned to contact with the gaseous stream after regeneration.

Other components of a gaseous stream, such as COS may also be removed by the method of this disclosure. The gaseous stream may be from a coal-fired power plant, or it may be flue gas, natural gas, hydrogen gas, synthesis gas or a waste gas stream.

Figure 2:
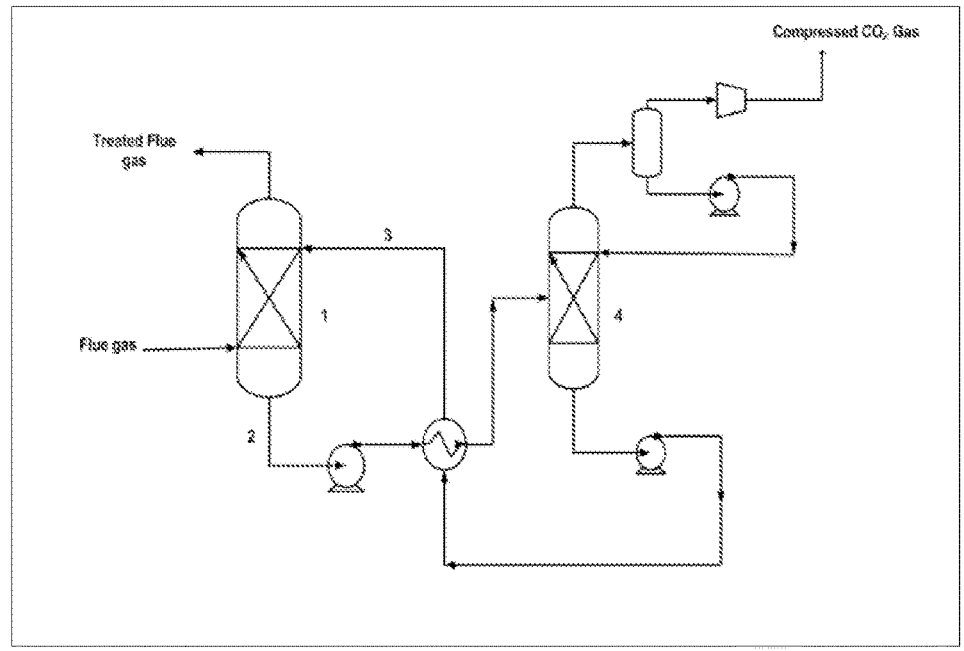
FIG. 2 is a perspective view of one illustrative embodiment.

FIG. 2 is a schematic diagram of an apparatus for removing acidic gases especially CO2. As shown in FIG. 2, gas is allowed to enter to an absorption tower 1 through a CO2-containing gas-feed. In a packed portion, the gas placed in the absorption tower 1 is brought into contact in a counter flow with a CO2 absorbent liquid fed from 3, and CO2 is absorb and removed from the gas by the absorbing liquid, and the resultant gas is discharge from the top as treated gas. The absorbent liquid fed to the absorption tower 1 absorbs CO2, and is led 2 to heat exchanger and heated and led to a regeneration tower 4. In the regeneration tower 4, the absorbent liquid flows through a packed portion towards the lower portion of the tower. During this time, CO2 is removed to regenerate the absorbent liquid. The regenerated absorbent liquid is led by a pump to the heat exchanger and fed back to the absorption tower 1 through an absorbent liquid feed inlet line 3.

On the other hand, in the upper portion of the regeneration tower 4, the CO$_2$ removed from the absorbent liquid is brought into contact with a reflux water, and cooled by a regeneration tower reflux condenser and, in a reflux drum, the CO$_2$ separated from the reflux water formed by condensing water vapor accompanying the CO$_2$, and led to a CO$_2$ recovery step. The reflux water is fed by a reflux water pump to the regenerator tower 4. This embodiment briefly describes an overview of the CO$_2$ capture process description.

Illustrative Examples and Proposed Theory

Heat to produce steam to maintain driving force for CO$_2$, For the CO$_2$, to be transferred from the liquid to the gas phase there needs to be driving force on the basis of partial pressure. Thus, steam acts in such a way as to provide this driving force so that the mass transfer of CO$_2$ from the liquid to the gas phase is enhanced. This also has energy associated with it, which contributes to the overall reboiler duty. This can be obtained by finding out the amount of water associated with the pure CO$_2$ steam produced as this energy in the form of water is lost and needs to be provided by the reboiler. The stripping heat consists of the following:

$Q_T = Q_{sens} + Q_{des} Q_{strip}$

Sensible Heat of CO$_2$ Rich Solvent to Raise the Stripper Temperature

One specific solvent loaded with CO$_2$ in the absorber may be heated up to stripper temperature for the regeneration of CO$_2$. One specific solvent stream can be pre-heated in the lean-rich cross heat exchanger and then additional heat may be used to maintain the temperature of one specific solvent in the stripper.

$$Q_{sens} = \frac{\delta C_P \Delta T}{(\alpha_{rich} - \alpha_{lean}) C_{amine}}$$

The contributing factors to the sensible heat are solvent flow, specific heat capacity of one specific solvent and the temperature increase. Thus, the only parameter that can be varied is one specific solvent flow which further depends on the concentration of one specific solvent and one specific solvent loadings. This can be decreased by circulating less solvent and maintaining the same CO$_2$ production rate. This is checked by means of comparing the Net Capacity of a solvent which is defined as the difference in the loading at the absorption and desorption conditions.

Heat of Desorption of CO$_2$

The CO$_2$ which is reversibly bound to one specific solvent needs to be regenerated. The heat of desorption is equivalent to the heat of absorption.

Heat to Produce Steam to Maintain Driving Force for CO$_2$

For the CO$_2$ to be transferred from the liquid to the gas phase there needs to be driving force in the basis of the partial pressure. Thus steam acts in such a way as to provide the driving force so that the mass transfer of CO$_2$ from the liquid to the gas phase is enhanced. This also has energy associated with it, which contributes to the overall reboiler duty. This can be obtained by finding out the amount of water associated with the pure CO$_2$ steam produced as this energy in the form of water is lost and needs to be provided by the rebuilder. The stripping heat consists of the following:

$$Q_{strip} = \frac{P^{sat}_{H2O}(T_{top,des}) X_{H2O,freebasis}}{P^*_{CO2}(T_{top,des} \cdot \alpha_{rich})} \Delta H^{vap}_{H2O}$$

Where $\Delta H_{H2O}^{vap}$ stands for heat of vaporization if water and $P_{CO2}^*$ is the partial pressure of CO$_2$ that would be equilibrium with the rich solution at the bottom of the absorber. Thus, finding

EXAMPLES

The disclosure will be further described in connection with the following examples, which are set forth for purposes of illustration only.

TABLE 1

|  |  | Sulfolane | EG | NMP | DEG | Methoxytri glycol |
|---|---|---|---|---|---|---|
| Molecular Weight | kg/kmol | 120.2 | 62.1 | 99.1 | 106.1 | 164.2 |

TABLE 1-continued

|  |  | Sulfolane | EG | NMP | DEG | Methoxytri glycol |
|---|---|---|---|---|---|---|
| Mass Cp | kJ/(kg * ° C.) | 1.2319 | 2.4734 | 1.6181 | 2.3353 | 2.19 |
| Dynamic Viscosity | cP | 7.9380 | 9.5081 | 1.4516 | 15.3050 | 7.3000 |
| Latent Heat of vaporization | kJ/kg | 435.11 | 849.57 | 453.74 | 540.63 | 301.00 |
| Boiling Point | Deg C. | 289.933 | 197.080 | 203.994 | 244.938 | 249.000 |

As the rate activator for the $CO_2$ absorption is piperazine and its derivative, the limitation with piperazine is its high volatility. It has highest reaction kinetics among its derivatives. It is white crystals which need more water to foam a clear solutions or need Polyethylene glycol to solubilize it. But because of the high volatility the loss of the piperazine is high and to minimize the volatility loss in the solvent, piperazine component is partly or completely replaced by rate activator such as N-2-hydroethyl piperazine whose vapor pressure is 99.7% less than piperazine.

| Reactive Amine | Piperazine | N-2-HYDROETHYL Piperazine |
|---|---|---|
| Formula | C4H10N2 | C6H14N2O |
| Mol. Wt | 84.16 | 130.19 |
| State | SOLID | LIQUID |
| Appearances | WHITE CRYSTAL | LIGHT YELLOW |
| M.pt (deg C.) | 106 | −10 |
| B.pt (deg C.) | 146 | 246 |
| Solubility (water) | SOLUBLE | SOLUBLE |
| Vapor pressure (mmHg) | 2.1 AT 20 C. | 0.00492 AT 25 C. |
| Acidity pKa | 9.8 |  |

Example 2

Below is the composition and characteristics of another exemplary solvent.

Density Measurement

The densities of were measured using a $25 \times 10^{-6}$ m$^3$ (at 298 K) Gay-Lussac pycnometer. For each run, the pycnometer containing the solvent solution was put in a constant temperature bath. The bath temperature was controlled within ±0.1 K of the desired temperature level using a circulator temperature controller. Once the solution reached the desired temperature, it was weighed to within ±0.0001 g with an analytical balance. Each reported density data is the average of at least three measurements.

Viscosity Measurement

The viscosities of solutions were measured using Cannon Fenske Viscometer. For each viscosity measurement, the temperature was controlled within ±0.1 K of the desired level with a circulator temperature controller. The viscometers containing samples were immersed in a thermostatic bath and allowed to equilibrate to the set point temperature for at least 15 min. Later, the efflux time of samples was measured manually with a digital stopwatch having an accuracy of 0.01 s. The efflux time is measured by allowing meniscus to pass between two specific marks. The kinematic viscosity was obtained by multiplying efflux time in seconds with the respective viscometer constant. The dynamic viscosity of the samples is calculated by multiplying the kinematic viscosity values with their corresponding density values. Each viscosity data is the average of at least three measurements.

|  | Mass % | Mol % | Molarity (mol/lit) | Molality (mol/kg water) | Density Kg/m$^3$ |
|---|---|---|---|---|---|
| MDEA | 25 | 7.3 | 2.185 | 5.387 | 1055 at 40° C. |
| Ethylene Glycol | 20 | 11.19 | 3.351 | 8.262 |  |
| Piperazine | 15 | 6.05 | 1.811 | 4.465 |  |
| K$_2$CO$_3$ | 1 | 0.25 | 0.0734 | 0.186 |  |
| H$_2$O | 39 | 75.21 |  |  |  |

Density and Viscosity of S1:

| Temp C. | viscosity m-Pa-sec | density kg/m3 |
|---|---|---|
| 30 | 10.16252 | 1065 |
| 40 | 6.962653 | 1055 |
| 50 | 4.170193 | 1048 |
| 60 | 2.777815 | 1040 |

Figure 3:
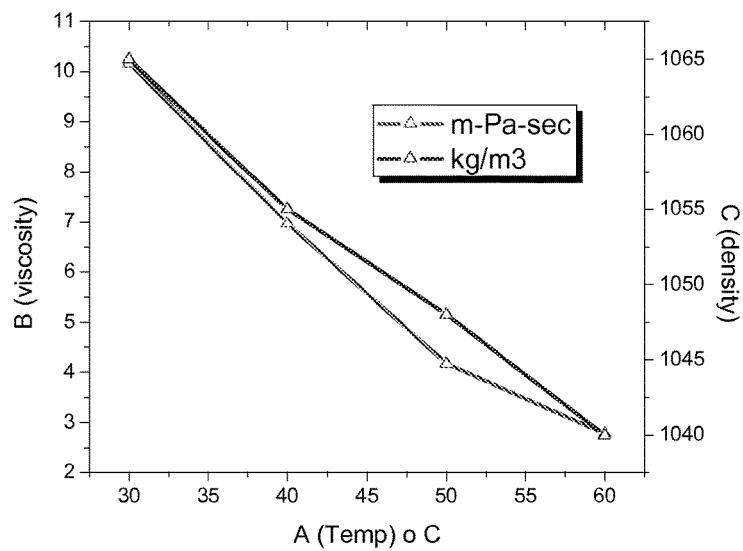
FIG. 3 shows a viscosity plot of one exemplary solvent.
Figure 4:
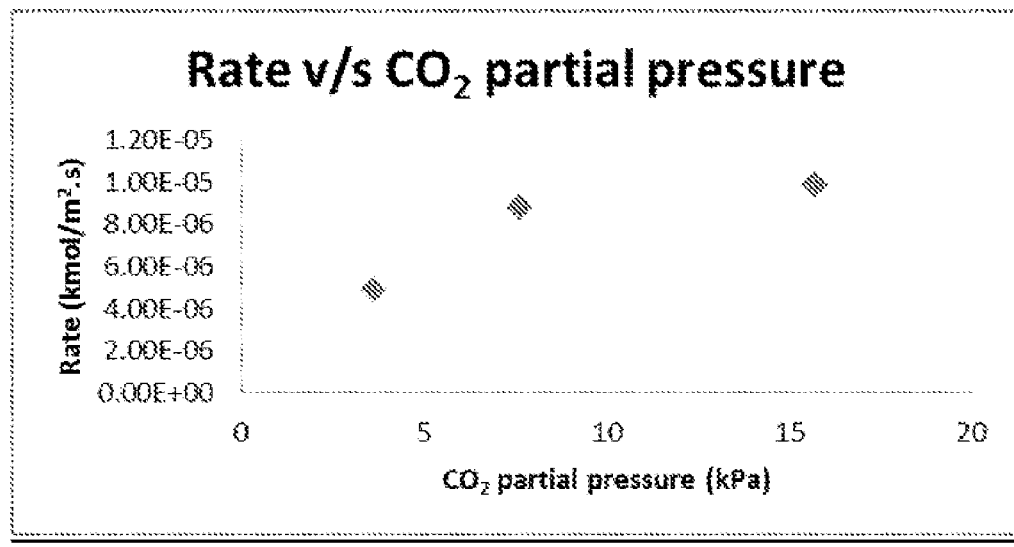
FIG. 4 shows a plot of the rate and CO2 partial pressures of an exemplary solvent.

FIG. 3 describes viscosity in mPa·sec and density in kg/m$^3$ (on Y-axis) w.r.t. temperature ° C. (on X-axis) for the solvent $S_1$. It is observed that viscosity and density decreases with the increase in temperature.

VLE of $S_1$

These measurements can determine the relationship between partial pressure of $CO_2$ and the subsequent loading of the solvent at different temperatures. This data can be used to do a first assessment of the solvent performance.

| T = 40° C. | |
|---|---|
| Loading | CO$_2$ PARTIAL pressure kPa |
| 0.118545 | 0.068 |
| 0.167315 | 0.208 |
| 0.20191 | 0.420 |
| 0.231713 | 0.963 |
| 0.27593 | 2.388 |
| 0.315874 | 5.076 |
| 0.356194 | 8.245 |
| 0.395963 | 14.492 |
| 0.470479 | 33.408 |
| 0.496462 | 50.479 |
| 0.539315 | 78.051 |
| 0.575544 | 98.729 |

| T = 50° C. | |
|---|---|
| (Loading | CO$_2$ PARTIAL pressure kPa |
| 0.067229 | 0.043 |
| 0.119626 | 0.159 |

-continued

T = 50° C.

| (Loading | $CO_2$ PARTIAL pressure kPa |
|---|---|
| 0.189261 | 0.710 |
| 0.232958 | 1.701 |
| 0.287389 | 4.549 |
| 0.320698 | 7.513 |
| 0.379275 | 16.116 |
| 0.400526 | 24.539 |
| 0.484553 | 62.484 |
| 0.516075 | 76.269 |
| 0.528049 | 103.841 |

Kinetics Experiments Results

|  | Mass % |
|---|---|
| MDEA | 25 |
| Ethylene Glycol | 20 |
| Piperazine | 15 |
| $K_2CO_3$ | 5 |
| $H_2O$ | 35 |

| Pressure kPa | Rate kmol/m² · s |
|---|---|
| 3.64 | 4.89E−06 |
| 7.62 | 8.82E−06 |
| 15.7 | 9.85E−06 |

Specific rate of absorption increases with $CO_2$ partial pressure.

Example 3

Below is the composition and characteristics of another exemplary solvent.
VLE Data for Solvent S2
(MDEA+PZ+Tetrahydrothiophenedioxide (SULFOLANE)+water (and K2CO3)) (48+2+10+40 wt %, respectively)

| T = 313 K | | T = 323 K | | T = 333 K | |
|---|---|---|---|---|---|
| $p_{CO_2}$/kPa | $\alpha_{CO_2}$ | $p_{CO_2}$/kPa | $\alpha_{CO_2}$ | $p_{CO_2}$/kPa | $\alpha_{CO_2}$ |
| 2.07 | 0.108 | 26.88 | 0.263 | 41.28 | 0.249 |
| 28.95 | 0.362 | 82.71 | 0.474 | 192.63 | 0.464 |
| 53.76 | 0.493 | 261.78 | 0.708 | 343.84 | 0.636 |
| 93.05 | 0.633 | 506.91 | 0.868 | 616.88 | 0.754 |
| 254.35 | 0.790 | 677.88 | 0.946 | 855.13 | 0.894 |
| 496.29 | 0.934 | 856.09 | 1.020 | 1082.87 | 0.996 |
| 622.43 | 0.997 | 955.89 | 1.087 | 1127.33 | 1.062 |
| 756.84 | 1.032 | | | 1355.41 | 1.120 |
| 955.89 | 1.110 | | | | |

VLE Data for (MDEA+PZ+SULFOLANE+($H_2O$ and K2CO3)) (45+5+10+40 wt %, Respectively)

| T = 313 K | | T = 323 K | | T = 333 K | |
|---|---|---|---|---|---|
| $p_{CO_2}$/kPa | $\alpha_{CO_2}$ | $p_{CO_2}$/kPa | $\alpha_{CO_2}$ | $p_{CO_2}$/kPa | $\alpha_{CO_2}$ |
| 39.29 | 0.381 | 6.20 | 0.112 | 39.90 | 0.282 |
| 97.19 | 0.637 | 86.85 | 0.488 | 125.50 | 0.492 |
| 328.79 | 0.876 | 225.45 | 0.735 | 308.66 | 0.668 |
| 554.92 | 0.984 | 492.84 | 0.915 | 458.63 | 0.795 |
| 812.58 | 1.068 | 622.91 | 0.989 | 630.56 | 0.860 |
| 1046.34 | 1.132 | 851.53 | 1.044 | 834.36 | 0.954 |
| | | 1022.51 | 1.079 | 1070.16 | 1.048 |
| | | 1104.77 | 1.094 | 1334.16 | 1.157 |
| | | 1292.37 | 1.137 | | |

VLE Data for (MDEA+PZ+SULFOLANE+Water (and $K_2CO_3$)) (42+8+10+40 wt %, Respectively)

| T = 313 K | | T = 323 K | | T = 333 K | |
|---|---|---|---|---|---|
| $p_{CO_2}$/kPa | $\alpha_{CO_2}$ | $p_{CO_2}$/kPa | $\alpha_{CO_2}$ | $p_{CO_2}$/kPa | $\alpha_{CO_2}$ |
| 1.24 | 0.236 | 5.38 | 0.321 | 16.80 | 0.264 |
| 16.18 | 0.503 | 49.49 | 0.567 | 65.72 | 0.455 |
| 94.38 | 0.750 | 101.33 | 0.671 | 174.93 | 0.615 |
| 192.78 | 0.855 | 145.10 | 0.738 | 326.32 | 0.805 |
| 223.33 | 0.895 | 274.27 | 0.848 | 497.35 | 0.898 |
| 465.28 | 1.004 | 332.93 | 0.860 | 670.47 | 0.936 |
| 599.69 | 1.082 | 545.93 | 0.973 | 833.25 | 0.997 |
| 777.53 | 1.144 | 779.60 | 1.075 | 1095.73 | 1.069 |
| 976.05 | 1.169 | 984.32 | 1.130 | 1164.45 | 1.091 |
| 1013.27 | 1.182 | | | | |

The invention claimed is:
1. A solvent for recovering carbon dioxide from a gaseous mixture, consisting of:
(a) 30 to 40 wt % of an alkanolamine, wherein the alkanolamine is either N-methyldiethanolamine (MDEA) or 2-amino-2-methyl-1-propanol (AMP),
(b) 10 to 18 wt % of a reactive amine, wherein reactive amine is N-aminoethylpiperazine (AEP),
(c) a carbonate buffer, and
(d) 15 to 20 wt % of a glycol,
wherein the solvent contains less than about 45% by weight of water and is in a single liquid phase.
2. The solvent as claimed in claim 1, wherein the glycol is polyethylene glycol.
3. The solvent as claimed in claim 1, the solvent is less than about 30% by weight of water.
4. The solvent as claimed in claim 1, wherein the carbonate buffer is a potassium carbonate buffer.
5. The solvent as claimed in claim 1, wherein the reactive amine is between 11% and 15 wt % of the solvent.
6. The solvent as claimed in claim 1, wherein the carbonate buffer buffers the solution to a pH of between about 12 and 14 in the absence of CO2.
7. The solvent as claimed in claim 1, wherein the glycol is monoethylene glycol.

8. The solvent as claimed in claim 1, wherein the glycol is diethylene glycol (DEG).

9. A solvent for recovering carbon dioxide from a gaseous mixture, consisting of:
   (a) 20 to 40 wt % of an alkanolamine,
   (b) 10 to 20 wt % of a reactive amine,
   (c) carbonate buffer, (d) 10 to 20 wt % of a glycol, and (e) less than 60 wt % water, wherein the solvent is in a single liquid phase, wherein the alkanolamine is N-methyldiethanolamine (MDEA) and the reactive amine is N-aminoethylpiperazine (AEP).

10. The solvent as claimed in claim 9, wherein the glycol is ethylene glycol.

* * * * *